(12) United States Patent
Roeder et al.

(10) Patent No.: US 7,185,942 B2
(45) Date of Patent: Mar. 6, 2007

(54) COVER ASSEMBLY FOR VEHICLES WITH AN OPENABLE ROOF

(75) Inventors: Holger Roeder, Eislingen (DE); Corinna Fuchs, Ludwigsburg (DE)

(73) Assignee: Magna Car Top Systems GmbH (DE)

( * ) Notice: Subject to any disclaimer, the term of this patent is extended or adjusted under 35 U.S.C. 154(b) by 0 days.

(21) Appl. No.: 11/265,929

(22) Filed: Nov. 3, 2005

(65) Prior Publication Data

US 2006/0105606 A1    May 18, 2006

(30) Foreign Application Priority Data

Nov. 9, 2004    (DE)    ...................... 10 2004 054 263

(51) Int. Cl.
*B60J 7/20* (2006.01)
(52) U.S. Cl. .............................. 296/136.06; 296/107.08
(58) Field of Classification Search ........... 296/136.06, 296/136.05, 136.03, 107.08
See application file for complete search history.

(56) References Cited

U.S. PATENT DOCUMENTS

| | | | | | |
|---|---|---|---|---|---|
| 2,747,928 | A | * | 5/1956 | Olivier ................... | 296/136.06 |
| 5,921,608 | A | * | 7/1999 | Schmitt et al. ........ | 296/136.06 |
| 5,967,593 | A | * | 10/1999 | Schuler et al. ......... | 296/136.06 |
| 6,318,792 | B1 | * | 11/2001 | Neubrand et al. ..... | 296/136.06 |
| 6,364,396 | B1 | * | 4/2002 | Hayashi et al. ........ | 296/136.06 |
| 6,604,774 | B2 | * | 8/2003 | Koch et al. ............. | 296/107.08 |
| 6,616,213 | B2 | * | 9/2003 | Koch ...................... | 296/107.08 |
| 6,644,715 | B1 | * | 11/2003 | Bohnke .................. | 296/107.08 |
| 6,663,163 | B2 | * | 12/2003 | Koch ...................... | 296/107.08 |
| 6,682,124 | B1 | * | 1/2004 | Bohnke .................. | 296/136.06 |
| 6,736,443 | B2 | * | 5/2004 | Holst et al. ............. | 296/136.06 |
| 7,032,947 | B2 | * | 4/2006 | Queveau et al. ....... | 296/136.05 |
| 2006/0043758 | A1 | * | 3/2006 | Powell ................... | 296/107.08 |
| 2006/0082185 | A1 | * | 4/2006 | Roeder et al. .......... | 296/107.01 |

FOREIGN PATENT DOCUMENTS

| | | |
|---|---|---|
| DE | 10051615 | 5/2001 |
| DE | 10220770 | 11/2003 |

* cited by examiner

*Primary Examiner*—Kiran B. Patel
(74) *Attorney, Agent, or Firm*—Brooks Kushman P.C.

(57) ABSTRACT

A cover assembly system is proposed for vehicles with an openable roof, the cover assembly system having at least one middle section and two side flaps that may be adjusted between a closed position and a stored position. The side flaps in their closed position together with the middle section forming a flat cover. Each side flap may be connected to a swivel bearing having a pivot axis. The side sections may be swiveled along the pivot axes between the closed position. The pivot axes extend essentially parallel to and directly adjoin the middle planar extension of the flat cover.

10 Claims, 3 Drawing Sheets

COVER ASSEMBLY FOR VEHICLES WITH AN OPENABLE ROOF

BACKGROUND OF THE INVENTION

1. Field of the Invention

The invention relates to a cover assembly for vehicles with an openable roof.

2. Background Art

German published patent application DE 102 22 189 A1 discloses a cover assembly having a middle section and two side flaps associated with this middle section. The side flaps are supported on the middle section by a rotary bearing. The side flaps can be lowered means of the rotary bearing from a position in which together with the middle section they form a flat cover, and then by providing a pivoting motion the side flaps can be stored underneath the middle section.

German published patent application DE 100 51 615 A1 discloses a cover assembly for vehicles with an openable roof, having two pivotable side flaps. A swing arm pivotably links the side flaps to the middle section. A common motor for both side flaps drives the pivoting motion.

Published PCT patent application WO 01/45976 A1 discloses a cover assembly having a middle section and two side flaps. The side flaps are disposed, on a pivot axis which is parallel to the transverse axis of the vehicle and situated beneath the middle section. The side flaps can be adjusted using a suitable sliding guide from a horizontal position (viewed in the orientation of the vehicle) in which, together with the middle section, the side flaps form a flat cover to an oblique stored position that is downward and to the rear of the middle section.

Applicants' invention is intended to improve on the above designs as summarized below.

SUMMARY OF THE INVENTION

One aspect of the present invention is to provide a simplified cover assembly for vehicles with an openable roof having a reduced number of parts and components that may be separately assembled from other components. The cover assembly in a covered position has a middle section and two side flaps. The side flaps are used to cover the components of a vehicle with an openable roof such as a convertible. The components are located in the vehicle interior and are visible when the roof is in the open position without the side flaps. The side flaps cover the space above a lowerable C-pillar when the C-pillar is in a lowered position.

The vehicle interior is partially covered with a middle section of the cover assembly when the C-pillars are in the non-lowered state. The side flaps of the cover assembly cover the additional space above the lowered C-pillars. The side flaps can be adjusted from the covered position to a stored position. The side flaps together with the middle section form a flat cover in the covered position. In the stored position, the side flaps are stowed to reveal the space occupied by the C-pillars when the C-pillars are in the non-lowered state.

The side sections flaps are adjusted on a swivel bearing having a pivot axis. The pivot axis is essentially parallel to the planar surface of the flat cover and to the planar surface of the side flap. The pivot axis is located adjacent to the planar surface of the flat cover to allow the side flaps to be folded out from an imaginary plane formed by the planar surface of the cover. The side flaps are moved in the stored position by pivoting the side flaps approximately 180° so that the side flaps are positioned approximately parallel to and adjoining the imaginary plane.

The side flaps may be connected to a pivot lever. The pivot lever is supported on the swivel bearing. The pivot lever bridges the distance between the pivot axis and the side flaps. The pivot lever may be positioned at an angle relative to the pivot axis. The angle between the pivot lever and the first axis may be an acute angle that is less than 90°. Both the angle between the pivot lever and the pivot axis, and the length of the pivot lever may be varied to accommodate different stored positions of the side flaps. The side flaps may be approximately parallel to the planar surface of a rear cover of the vehicle when the side flaps are in the stored position. The side flaps may also be inside and underneath a rear cover when the side flaps are in the stored position.

The pivot axes of the side flaps may be positioned at an angle with respect to the longitudinal axis of the vehicle. The side flaps may be pivoted about the longitudinal axis of the vehicle. The side flaps may be moved downward to the middle of the vehicle to a stored position if the angle between the pivot axes of the side flaps and the longitudinal axis of the vehicle is an acute angle that is less than 90°. The side flaps when in the stored position may be compactly stored near the middle of the vehicle and below the rear cover of the vehicle.

A module may be provided that includes the base plate, side flaps, pivot axis, and pivot lever. In the module, the pivot levers may be connected to a base plate and the base plate may be connected to a swivel bearing. The module may be pre-assembled.

The base plate may include fixing elements for installing the pre-assembled module to the vehicle. The base plate may be attached either to the rear cover of the vehicle, to the middle section, or to the vehicle body using the fixing elements.

Each of the side flaps may be swiveled using a drive. The drive may be connected with the swivel bearings. The drive may include two individual sub-drives. A drive axis of the drive may be coaxial with the pivot axis of the side flaps or the pivot axis of the swivel bearing. The drive may also be pre-attached to the modules without attachment to the vehicle to provide a complete pre-assembled module comprised of the drive, base plate, swivel bearing, pivot lever, side flap and connecting elements. The connecting elements may be, for example, screws, rivets, clips, catches, rivets, or other suitable connectors.

The base plate may be provided with an electric motor. The electric motor may be an electric geared motor. Alternatively, the side sections of the cover assembly may be actuated separately by two motors to eliminate the need for power distribution systems such as systems using Bowden cables coupled to a central drive.

The base plate may be attached to the vehicle components with adjustable fixing elements such as adjusting screws, washers, etc. By providing an adjustable attachment of the base plate to the vehicle components, the side flaps may be adjusted to allow them to pivot either before or after adjustments are made to the module. The side flaps may be adjusted when they are in either the covered position or the stored position. Adjustments to the module in either the covered position or the stored position may be made to accommodate tolerances inherent in vehicle manufacturing processes.

Other advantages and useful embodiments are disclosed or suggested in the claims, the description of the figures, and the drawings.

DETAILED DESCRIPTION OF THE PREFERRED EMBODIMENT(S)

Figure 1:
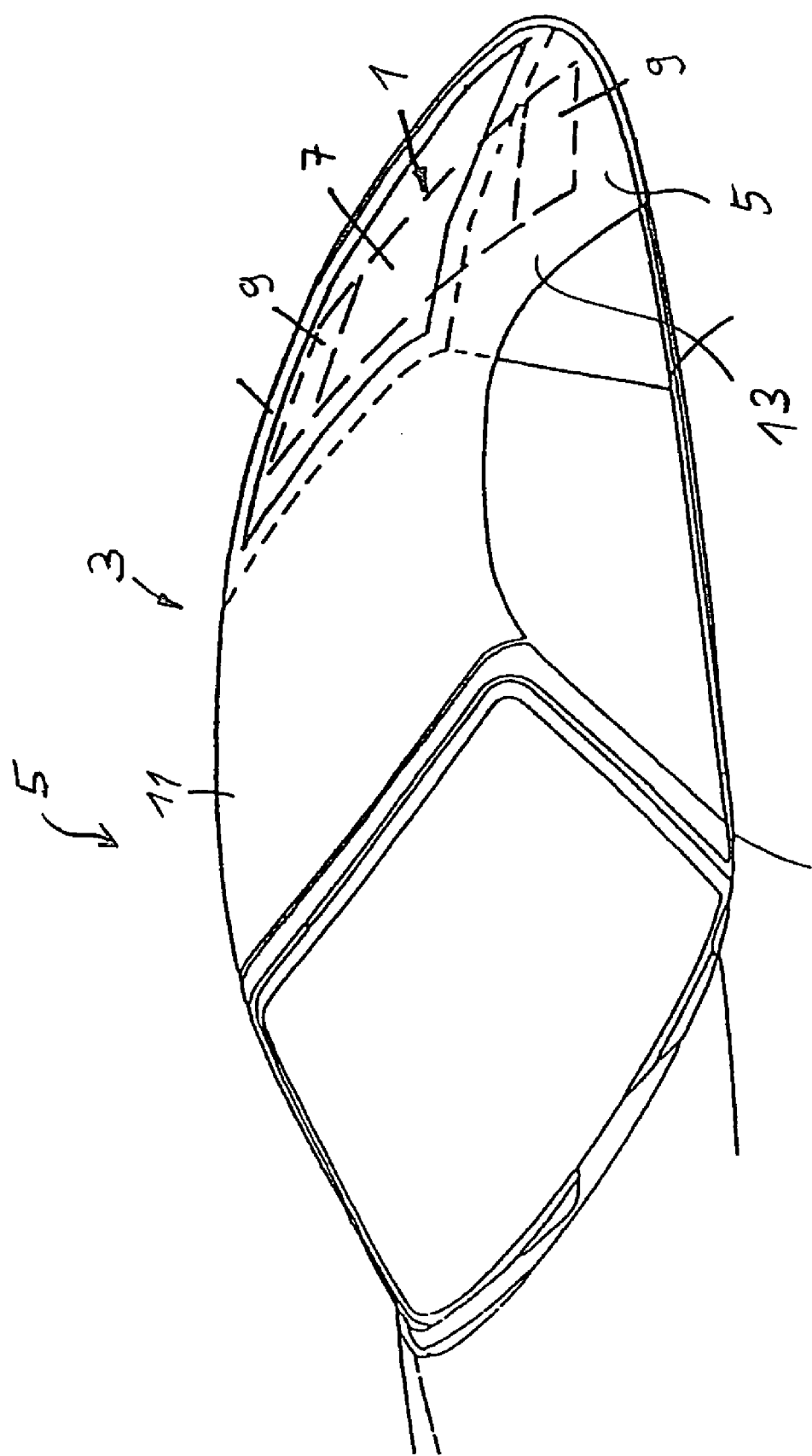
FIG. 1 is a perspective upper diagonal view of a section of a vehicle with an openable roof having a cover assembly made according to the invention.

FIG. 1 shows a cover assembly 1 for an adjustable roof 3, either a hardtop or soft-top, of a partially illustrated vehicle 5. The cover assembly 1 has a middle section 7 and two side flaps 9 that are in generally the same plane and are adjacent to the middle section 7. The roof 3 of the vehicle 5 may have a roof section 11 which can be adjusted between a closed position and a folded-away position. The roof section 11 is illustrated in a closed position. The cover assembly 1 of the vehicle 5 may serve as a rear shelf when the roof 3 of the vehicle 5 is in the closed position.

The vehicle 5 has C-pillars 13 that may be lowered. The C-pillars 13 may be moved independently or together with the roof section 11 to a stored position inside the vehicle 5. The roof section 11 and the C-pillar 13 may be covered by the cover assembly 1 when the roof section 11 is in the folded-away position. Lowering of the C-pillars 13 creates a space. The cover assembly 1 may function to cover the space. The side flaps 9 may be adjusted between a covered position and a stored position. The cover assembly 1 is flexibly designed to hide functional parts of the vehicle 3 from view when the cover assembly is in the partially opened state, i.e., with the roof section 11 stored and the C-pillar 13 not lowered, and also when the C-pillar 13 is stored.

Figure 2:
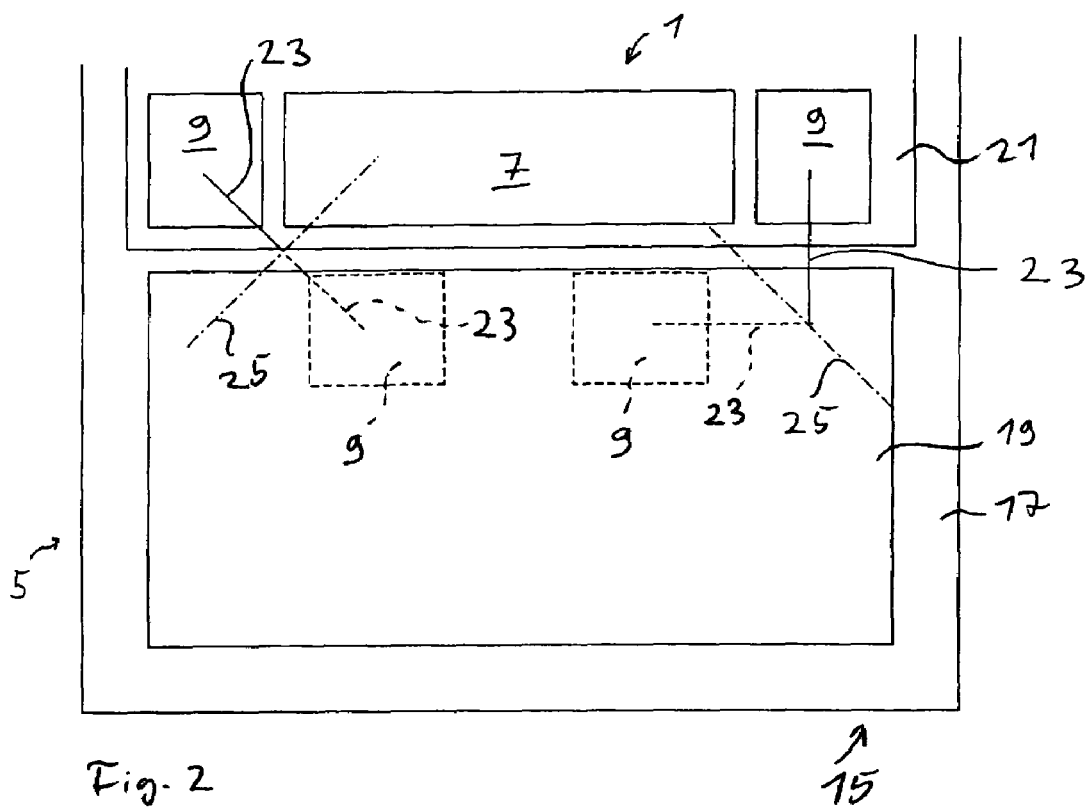
FIGS. 2 and 3 are schematic top plan views of a rear area of a vehicle with an openable roof and a cover assembly in which the side flaps of the cover assembly are shown in four different stored positions.
Figure 3:
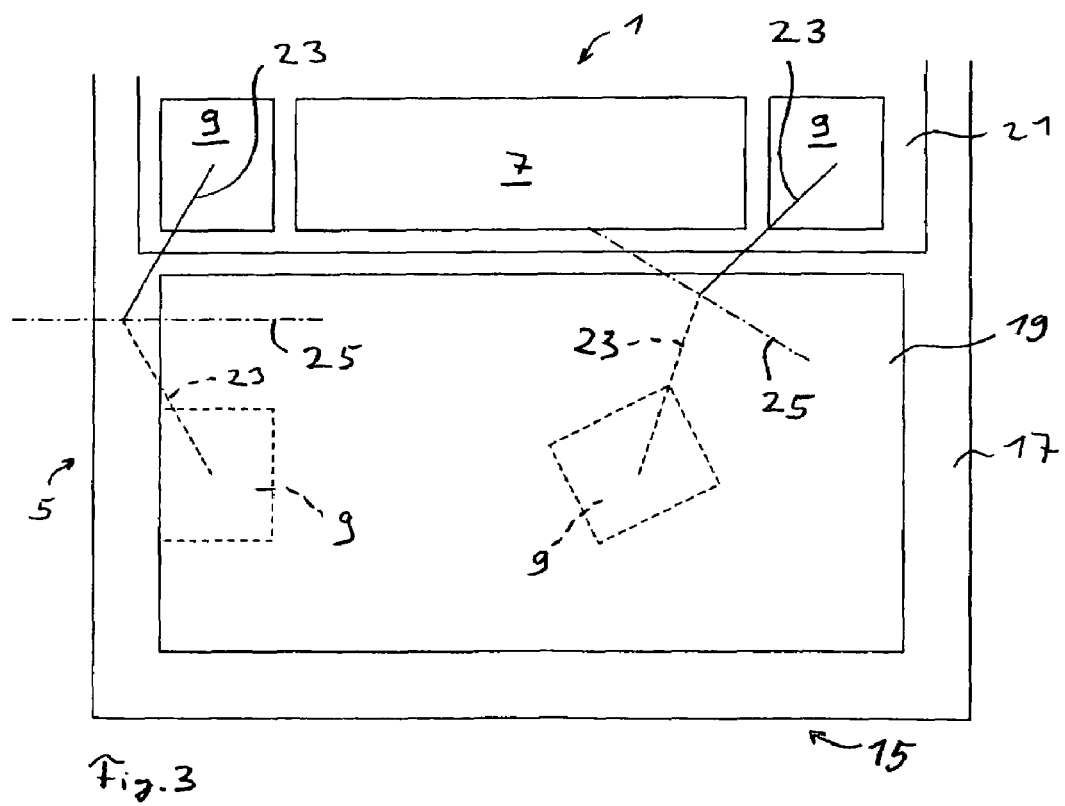

FIGS. 2 and 3 are schematic top views of a rear end 15 of the vehicle 5. The vehicle 5 has a body 17 and a rear cover 19. The rear cover 19 can be adjusted or opened to receive luggage and/or parts of the roof 3 of the vehicle 5. The top surface of the cover assembly 1 of the vehicle 5 may be visible through a rear window 21.

FIGS. 2 and 3, when taken together, illustrate four different embodiments of the side flaps 9 in stored positions. Dashed lines indicate four different stored positions of the side flaps 9 of the cover assembly 1. The cover assembly 1 of the vehicle 5 may combine either two identical embodiments of the side flaps 9 or any two different embodiments of the side flaps 9. The combination of two side flaps 9 may be symmetrically mirrored as shown in FIGS. 2 and 3.

Each embodiment of the side flaps 9 has the side flaps 9 connected to a pivot lever 23. The pivot lever 23 of the cover assembly 1 pivots about a pivot axis 25. The pivot axis 25 is angled relative to the longitudinal axis of the vehicle. FIG. 2 shows an approximately 45° angle between the longitudinal axis 2 of the vehicle 5 and the pivot axis 25. FIG. 3 shows an approximately 90° angle between the longitudinal axis 2 of the vehicle 5 and the pivot axis 25 located on the left side of FIG. 3.

The right side of FIG. 3 shows an approximately 60° angle between the longitudinal axis 2 of the vehicle 5 and pivot axis 25. Different angles between the pivot axis 25 and the longitudinal axis 2 allow for different stored positions of the side flaps 9 inside the vehicle 5.

FIG. 2 illustrates two stored positions below the rear cover 19 mirrored symmetrically with respect to the left side flap 9 and the right side flap 9. The relative position between the pivot axis 25 and the pivot lever 23 of the left side flap 9 is different from the relative position between the pivot axis 25 and the pivot lever 23 of the right side flap 9.

The pivot lever 23 that is connected to the left side flap 9 of FIG. 2 is approximately perpendicular to the pivot axis 25. The point of intersection of the pivot axis 25 and the pivot lever 23 of the cover assembly 1 is located approximately between the rear window 21 and the rear cover 19 of the vehicle 5. In the stored position, the pivot lever 23 points from the side section 9 toward the interior of the vehicle. The pivot lever 23 connected to the right side flap 9 of FIG. 2 is approximately parallel to the longitudinal axis 2 of the vehicle 5. The pivot lever 23 connected to the right side flap 9 of FIG. 2 is angled at approximately 45° with respect to the pivot axis 25 of the right side flap 9.

Figure 4:
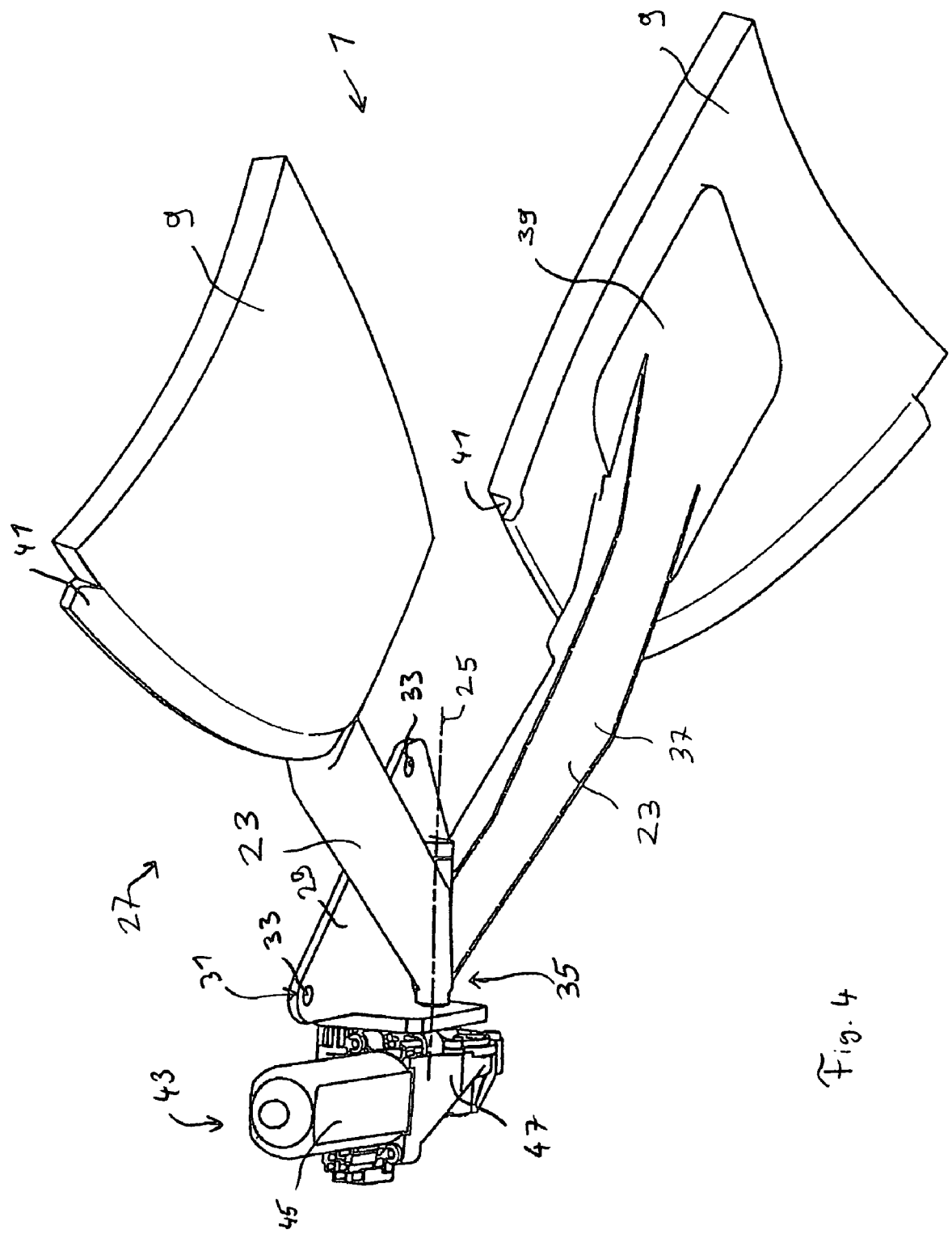
FIG. 4 is a detailed perspective view of a module, together with a side flap of a cover assembly for a vehicle with an openable roof.

A swivel bearing, illustrated in FIG. 4 but not illustrated in FIGS. 2 and 3, may be provided at the connection between the pivot axis 25 and the pivot lever 23 of the cover assembly 1. The swivel bearing may be attached to the body 17 of the vehicle 5 and located between the rear window 21 and the rear cover 19 of the vehicle 5.

The swivel bearing may be provided at the connection between the pivot axis 25 and the pivot lever 23 of the left side flap 9 between the exterior of the vehicle 5 and the rear cover 19. For example, the swivel bearing may be located between the fenders of the body 17 of the vehicle 5. The pivot lever 23 that is connected to the right side flap 9 of FIG. 3 forms an acute angle with respect to the pivot axis 25 of the right side flap 9 of FIG. 3. When the right side flap 9 is in the stored position, the pivot lever 23 is connected to the right side flap 9 so that it points from the side flap 9 toward the exterior of the vehicle 5.

The swivel bearing may be provided at the connection between the pivot axis 25 and the pivot lever 23 of the right side flap 9 and may be attached to the rear cover 19 of the vehicle 5. The swivel bearing may be attached to the interior surface of the rear cover 19 of the vehicle 5. Therefore, the side sections 9 of the cover assembly 1 may track the motions of the rear cover 19 when the rear cover 19 is either opened or closed. When the rear cover 19 is opened, each side flap 9 of the cover assembly 1 is simultaneously pivoted in the stored position and moved with the rear cover 19. Simultaneous movement of each side flap 9 of the cover assembly 1 and the rear cover 19 facilitates loading a trunk or storage case below the roof 3 and may also facilitate storing the roof 3.

The left side flap 9 of FIG. 3 may be rotated about the pivot axis 25 to allow the side flap to close in a stored position approximately flush with the left side of the rear cover 19. When in a stored position, the side flap may be stored below a fender of the vehicle 5. Storing the side flap 9 below a fender using the swivel bearing attached to the body 17 of the vehicle 5 allows compact storage of the side flap 9, movement independent of the rear cover 19 and the cover assembly 1, and unhampered loading and unloading of the trunk when the rear cover 19 of the vehicle 5 is open.

In FIG. 4, a module 27 is illustrated for adjusting the side flaps 9 of the cover assembly 1. FIG. 4 illustrates two different positions of the side flaps 9 with the module 27 integrated therein. The two positions include the covered position and the stored position. The upper side flap 9 of FIG. 4 is in the stored position. The lower side flap 9 is in the covered position. The module 27 has only one side flap 9 that is shown in two different positions in FIG. 4.

The module 27 has a base plate 29. The base plate 29 has fixing elements 31 which may include boreholes 33. In the illustrated embodiment, the base plate 29 has three boreholes 33. The boreholes 33 in the base plate 29 may be connected to the rear cover 19 of the vehicle 5 using a suitable fixing means such as screws, rivets, clips, catches, adhesive bonding, or the like.

The base plate 29 has a generally flat shape to facilitate generally parallel attachment to the planar surface of the rear cover 19 to the vehicle 5. The planar surface of the side flap 9 is approximately parallel to both the planar surface of the base plate, and the planar surface of the rear cover 19 when the side flaps 9 are either in the covered position or stored position. The rear cover 19 is approximately parallel to the planar surface of the middle section 7 of the cover assembly 1 when the side flaps 9 are either in the covered position or stored position.

The base plate 29 has a swivel bearing 35 that allows the pivot lever 23 to rotate about the pivot axis 25. The pivot axis 25 of the swivel bearing 35 is adjacent to the planar surface of the base plate 29. When the base plate 29 is connected to the rear cover 19 of the vehicle 5, the pivot axis 25 is directly adjacent to the planar surface of the closed rear cover 19, i.e., directly adjacent to an imaginary plane formed by the planar surface of the cover assembly 1. The planar surfaces of the rear cover 19, the base plate 29, and the cover assembly 1 may also be slightly curved or cambered in a convex or concave manner. In this case, the term "planar surface" refers to a surface which most closely approximates a curvature. The term "directly adjacent" is a distance to such an imaginary plane having a value from zero to several centimeters in length. Therefore, two components of the vehicle 5 may be termed "directly adjacent" even if a gap exists between the components because one or more of the components has a curved surface.

FIG. 4 shows the pivot lever 23 having a curvature 37. Thus, depending on the angle of curvature 37 of the pivot lever 23, the directly adjacent position 25 of the base plate 29 with respect to the imaginary planes of the planar surfaces of other components may vary slightly. The curvature 37 of the pivot lever 23 allows adjustments to movement of the module 27 to accommodate different body shapes of the vehicle 5. In particular, the side flaps 9 may be adjusted to accommodate the covered position and the stored position of the side flaps 9.

The pivot lever 23 forms an acute angle with respect to the pivot axis 25. The acute angle may be approximately 45° to allow the covered part 9 in its covered position to rotate approximately 90° about a first axis and to tilt approximately 90° about a second axis. The pivot lever 23 allows the pivot axis 25 of the swivel bearing 35 to be positioned at a distance from the side sections 9 of the cover assembly 1.

The pivot lever 23 of the cover assembly 1 is connected to a fixing plate 39. The fixing plate 39 may be connected with the side flaps 9 of the module 27 using any suitable technique such as gluing, etc. The side flap 9 of the module 27 has a notch 41 located on two adjacent sides of the side flaps 9. When the side flaps 9 are in the covered position, the notch 41 may connect or abut with other parts of the vehicle 5, not illustrated here, to provide a closure having a flush fitting. For example, when the side flaps 9 are in the covered (stored) position, the notch 41 provides a closure for a rear shelf or cover for stored roof parts.

The base plate 29 of the module 27 is connected to a drive 43. The drive 43 includes an electric motor 45 and a gearing system 47. The output shaft of the gearing system 47 is either positioned coaxially with respect to the pivot axis 25 of the pivot lever 23 or rigidly connected to the pivot lever 23. The electric motor 45 may be connected to a gearing system 47. For example, the gearing system 47 may be a self-blocking worm gear.

The entire module 27, including the drive 43 for adjusting the side flaps 9, may be fully pre-assembled. The cover assembly 1 may have two modules 27 when installed in the vehicle 5. Each of the two modules has a drive 43 to adjust side flaps 9 corresponding to the modules 27. Using a single drive 43 to actuate a single side flap 9 eliminates the need for a power distribution from a central drive. Each side flap 9 of the cover assembly 1 may be actuated with a single drive 43 that operates independently of other drive 43. Using two drives 43 on the cover assembly 1 eliminates the need for additional controls, such as Bowden cables which are driven by a mid-engine.

The side flaps 9 and the pivot lever 23 may be molded as a single plastic part. The single plastic part rotates on the rotational axis of the base plate 29. The base plate 29 is connected to the swivel bearing 35. When installing the module 27, the base plate 29 may be attached to the drive 43 using a press force. The module 27 assembled in this manner may be delivered and connected to the vehicle 5 as a single unit. In particular, the module 27 may be connected to the rear cover 19 of the vehicle 5.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cover assembly system for vehicles with an openable roof, comprising:
   at least one middle section;
   two side flaps that move between a closed position and a stored position where each side flap has a swivel bearing;
   the side flaps and the middle section forming a flat cover when the side flaps are in the closed position;
   the side flaps being pivoted below a rear cover in the stored position;
   wherein each swivel bearing has a pivot axis about which one of the side flaps pivots between the closed position and the stored position, and further wherein the pivot axes are approximately parallel to and adjacent the planar surface of the flat cover.

2. The cover assembly system according to claim 1, wherein the pivot axes of the side flaps form an angle with respect to the longitudinal axis of the vehicle.

3. The cover assembly system according to claim 1, wherein the side sections are connected to a pivot lever that may swivel on a pivot axis.

4. The cover assembly system according to claim 3, wherein the pivot levers are connected to a base plate, where the base plate includes the swivel bearing.

5. The cover assembly system according to claim 4, wherein the base plate includes boreholes.

6. The cover assembly system according to claim 4, wherein the base plates are attached to components of the vehicle such as a rear cover or a vehicle body.

7. The cover assembly system according to claim 4, wherein the base plate is adjustably attached to the components of the vehicle.

8. The cover assembly system according to claim 1, wherein the swivel bearings are connected to a drive for swiveling the side flaps.

9. The cover assembly system according to claim 1, wherein at least one base plate is connected to at least one of the drives.

10. The cover assembly system according to claim 1, wherein a base plate is provided that includes an electric motor having a gearing system.

* * * * *